United States Patent [19]

Izukawa et al.

[11] Patent Number: 4,788,468
[45] Date of Patent: Nov. 29, 1988

[54] VIBRATION WAVE MOTOR

[75] Inventors: Kazuhiro Izukawa, Yokohama; Ichiro Okumura, Tokyo, both of Japan

[73] Assignee: Canon Kabushiki Kaisha, Tokyo, Japan

[21] Appl. No.: 63,765

[22] Filed: Jun. 23, 1987

Related U.S. Application Data

[63] Continuation of Ser. No. 623,334, Jun. 22, 1984.

[30] Foreign Application Priority Data

Jul. 4, 1983 [JP] Japan ............... 58-121464

[51] Int. Cl.$^4$ ............................................. H01L 41/08
[52] U.S. Cl. .................................. 310/323; 310/358; 310/359
[58] Field of Search ............... 310/323, 328, 332, 317, 310/800, 357–359

[56] References Cited

U.S. PATENT DOCUMENTS

| | | | |
|---|---|---|---|
| 2,439,499 | 4/1948 | Williams et al. | 310/82 UX |
| 4,019,073 | 4/1977 | Vishnevsky | 310/322 |
| 4,484,099 | 11/1984 | Kawai et al. | 310/323 X |
| 4,491,401 | 1/1985 | Inaba et al. | |
| 4,495,432 | 1/1985 | Katsuma et al. | 310/82 X |
| 4,504,760 | 3/1985 | Yamamoto et al. | 310/323 |
| 4,510,411 | 4/1985 | Hakamata | 310/323 X |
| 4,513,219 | 4/1985 | Katsuma et al. | 310/323 |
| 4,513,291 | 4/1985 | Drabowitch | |
| 4,560,263 | 12/1985 | Katsuma et al. | |
| 4,562,373 | 12/1985 | Tokusimo | 310/12 X |
| 4,562,374 | 12/1985 | Sashida | 310/328 |
| 4,580,073 | 4/1986 | Okumura et al. | |
| 4,587,452 | 5/1986 | Okumura et al. | |
| 4,652,786 | 3/1987 | Mishiro | 310/328 X |
| 4,660,933 | 4/1987 | Notagishira et al. | 310/323 |
| 4,678,956 | 7/1987 | Izukawa et al. | 310/328 X |
| 4,697,117 | 9/1987 | Mishiro | 310/323 |
| 4,723,085 | 2/1988 | Mukohijima et al. | 310/328 |

*Primary Examiner*—R. Skudy
*Attorney, Agent, or Firm*—Fitzpatrick, Cella, Harper & Scinto

[57] ABSTRACT

In a vibration wave motor for driving a movable member which contacts with a vibration member which in turn contacts an electrostrictive element, by a travelling vibration wave generated in the vibration member by applying periodic voltages to the electrostrictive element, the periodic voltages are applied to the electrostrictive element in the same direction as the amplitude direction of the travelling vibration wave to obtain a longitudinal effect so that drive efficiency is improved.

15 Claims, 5 Drawing Sheets

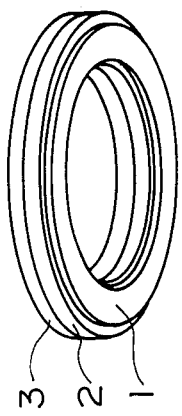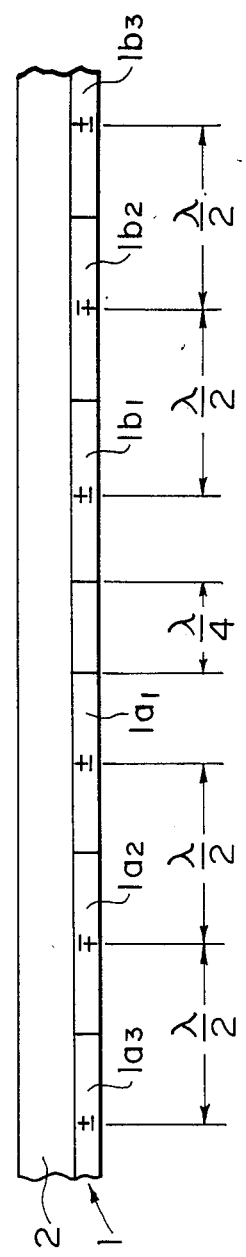

FIG. 4A
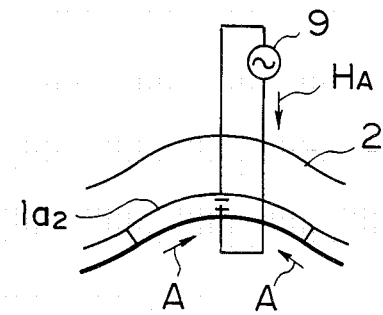
FIG. 4B
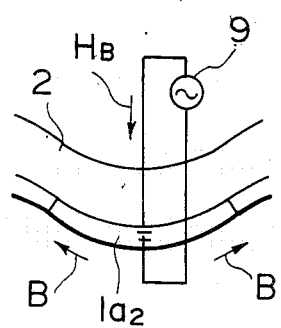
FIG. 5
(a)
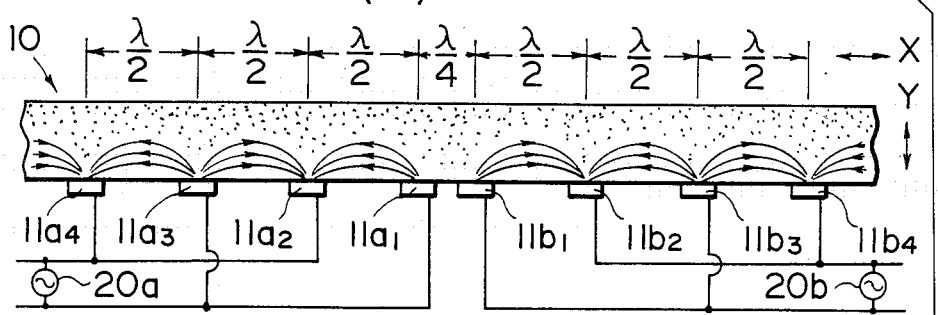
(b)
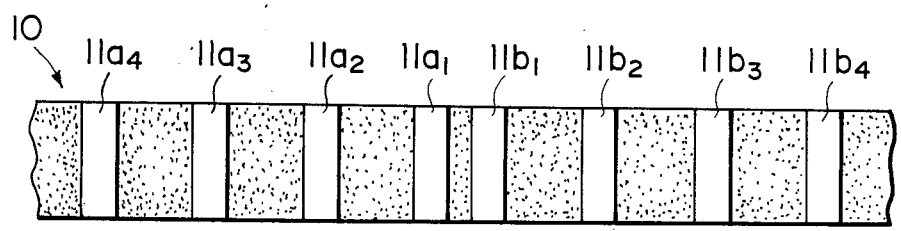

VIBRATION WAVE MOTOR

This application is a continuation of application Ser. No. 623,334 filed June 22, 1984.

BACKGROUND OF THE INVENTION

1. Field of the Invention

The present invention relates to a vibration wave motor which drives a movable member by a travelling vibration wave, and more particularly to a vibration direction of an electrostrictive element for generating the vibration wave.

2. Description of the Prior Art

As disclosed in U.S. Pat. No. 4,019,073, the vibration wave motor translates a vibration motion created when a periodic voltage such as an A.C. or a pulsating voltage is applied to an electrostrictive element to cause a rotating motion or a linear motion. Because it requires no winding as opposed to a conventional motor, it is simple and small in structure and can provide a high torque at a low rotating speed and has a low moment of inertia.

In the vibration wave motor disclosed in U.S. Pat. No. 4,019,073, the movable member such as a rotor which contacts the vibration member is friction-driven in one direction by a standing vibration wave created in the vibration member to translate the vibration motion to the rotating motion. During a forward motion of the vibration, the vibration member makes frictional contact with the movable member, and during a backward motion, they separate from each other. Accordingly, the vibration member and the movable member must make contact in a small area, that is, a point contact or a line contact. As a result, the friction drive efficiency is low.

A vibration wave motor which improves the above aspect and friction-drives the movable member by a travelling vibration wave created in the vibration member is desirable.

FIG. 1 shows a schematic view thereof. Numeral 1 denotes an electrostrictive element such as PZT (e.g. the solid-solution of $PbZrO_3$ and $PbTiO_3$) and numeral 2 denotes a vibration member made of an elastic material to which the electrostrictive element 1 is bonded. The vibration member 2 and the electrostrictive element 1 are held on a stator (not shown). Numeral 3 denotes a vibration member which is press-contacted to the vibration member 2 to form a rotor.

FIG. 2 is a side view showing a relation between the electrostrictive element 1 and the vibration member 2. The electrostrictive element 1 includes a plurality of elements $1a_1, 1a_2, 1a_3, \ldots$ and $1b_1, 1b_2, 1b_3, \ldots$ and one group of elements $1a_1, 1a_2, 1a_3, \ldots$ are arranged to shift by one quarter of a wavelength $\lambda$ of the vibration wave from the other group of elements $1b_1, 1b_2, 1b_3, \ldots$. In the one group of elements, the elements $1a_1, 1a_2, 1a_3, \ldots$ are arranged at a pitch of one half of the wavelength with opposite polarization polarities between adjacent elements. In FIG. 2, (+) and (−) indicate the polarities. In the other group of elements, the elements $1b_1, 1b_2, 1b_3, \ldots$ are arranged at the pitch of one half of the wavelength with the opposite polarities between adjacent elements. Alternatively, a single electrostrictive element having the same size as that of the arrangement of the elements $1a_1, 1a_2, \ldots, 1b_1, 1b_2, \ldots$ may be polarized at the pitch of one half of the wavelength. Electrodes for applying voltages to the electrostrictive elements are vapor-deposited or formed on both surfaces of the electrostrictive element.

In this vibration wave motor, an A.C. voltage of $V_0 \sin \omega T$ is applied to all electrostrictive elements $1a_1, 1a_2, 1a_3, 1a_4, \ldots$ in one group, and an A.C. voltage of $V_0 \cos \omega T$ is applied to the elements $1b_1, 1b_2, 1b_3, 1b_4, \ldots$ of the other group. Thus, A.C. voltages which are phase-shifted by 180 degrees from each other between adjacent ones and by 90 degrees between two groups are applied to the electrostrictive elements so that they expand and shrink. This vibration is propagated to the vibration member 2, which is bent in accordacne with the pitch of the arrangement of the electrostrictive elements 1. The vibration member 2 protrudes at every other electrostrictive element position and sinks at every other alternate position. As described above, since one group of the electrostrictive elements is one quarter of the wavelength shifted from the other group, and the phases of the bending vibrations have 90 degrees phase difference from each other, the vibration waves are combined and travel. While the A.C. voltages are applied, the vibrations are successively excited to cause travelling bending vibration waves, which propagate through the vibration member 2.

The motion of the wave is illustrated in FIGS. 3(a)-(d). Assuming that the travelling bending vibration wave travels in an X direction and 0 denotes a center plane of the vibration member in a quiescent state, in a vibration state, a neutral plane 6 shown by a chain line is acted on by bending stresses. Considering a sectional plane 7 normal to the neutral plane 6, no stress is applied to a crossing line 5 of those planes and it merely vibrates vertically. The sectional plane 7 makes a pendulum vibration laterally around the crossing line 5. In FIG. 3(a), a point P on a crossing line of the sectional plane 7 and the surface of the vibration member 2 facing the movable member 1 is a right dead center of the lateral vibration and makes only an upward motion. In this pendulum vibration, a leftward stress (opposite to the wave travel) is applied when the crossing line 5 is on a positive side of the wave (above the center plane 0), and a rightward stress is applied when the line 5 is on a negative side of the wave (below the center plane 0). In FIG. 3(a), a crossing line 5' and a sectional plane 7' correspond to the former case in which a stress F' is applied to the point P, and a crossing line 5'' and a sectional plane 7'' correspond to the latter case in which a stress F'' is applied to the point P. As the wave travels and the point P comes to the positive side of the wave as shown in FIG. 3(b), the point P makes a leftward motion and an upward motion simultaneously. In FIG. 3(c), the point P is a top dead center of the vertical motion and makes only the leftward motion. In FIG. 3(d), the point P makes the leftward motion and the downward motion. As the wave further propagates, the point P makes the rightward and downward motions, and the rightward and upward motions, and returns to the state of FIG. 3(a). By the combination of the series of motions, the point P makes a rotating elliptic motion. A radius of rotation is a function of t/2 where t is a thickness of the vibration member 2. As shown in FIG. 3(c), on a line at which the point P contacts the movable member 3, the movable member 3 is friction-driven in an X' direction by the motion of the point P.

The vibration wave motor driven in this manner does not provide sufficient drive efficiency.

The manner of the vibration of the electrostrictive element is now explained in further detail. In FIG. 4A, when a positive (forward direction $H_A$) voltage is applied to the electrostrictive element $1a_2$ in the polarization direction from an A.C. drive source 9, the electrostrictive element $1a_2$ expands in the electric field direction, that is, the thickness direction and shrinks in the direction normal to the electric field direction, as shown by arrows A. In FIG. 4B, when the voltage is applied to the electrostrictive element $1a_2$ in the opposite direction $H_B$, it shrinks in the electric field direction and expands in the direction normal to the electric field direction as shown by arrows B. As the electrostrictive element 1 expands and shrinks in the direction of the bonding surface to the vibration member 2, the vibration member 2 bonded thereto is bent.

The direction of the voltage applied to the electrostrictive element 1 is normal to the direction of the expansion/shrinkage motion which causes the bending vibration in the vibration member 2. That is, the direction of the voltage application and the direction of the expansion/shrinkage motion cross each other to make a lateral effect motion. Because of the lateral effect motion, the drive efficiency of the prior art vibration wave motor is low.

SUMMARY OF THE INVENTION

It is an object of the present invention to provide a vibration wave motor having a high drive efficiency by applying a periodic voltage to an electrostrictive element in the same direction as an amplitude direction of a travelling vibration wave.

Other objects of the present invention will be apparent from the following description of the preferred embodiments.

BRIEF DESCRIPTION OF THE DRAWINGS

FIG. 1 is a schematic view of a main portion of a vibration wave motor,

FIG. 2 is a side view illustrating a relation between an electrostrictive element and a vibration member of FIG. 1.

DETAILED DESCRIPTION OF THE PREFERRED EMBODIMENTS

FIG. 5 shows a first embodiment of the vibration wave motor of the present invention. It diagramatically shows structures of an electrostrictive element and electrodes.

FIG. 5a is a side view and FIG. 5b is a view seen from the electrodes. Numeral 10 denotes the electrostrictive element and numerals $11a_1$, $11a_2$, $11a_3$, ... and $11b_1$, $11b_2$, $11b_3$, ... denote the electrodes mounted on the electrostrictive element 10. The electrodes $11a_1$, $11a_2$, $11a_3$ ... (or $11b_1$, $11b_2$, $11b_3$, ...) are wired such that alternate ones are of the same potential. Voltages are previously applied to the electrostrictive element 10 through the electrodes $11a_1$, $11a_2$, $11a_3$ ... and $11b_1$, $11b_2$, $11b_3$, ... to polarize it. When a positive voltage is applied to the electrode groups $11a_1$, $11a_3$, ... and $11b_1$, $11b_3$, ... and a negative voltage is applied to the electrode groups $11a_2$, $11a_4$, ... and $11b_2$, $11b_4$, ..., electric fields as shown by arrows (lines of electric force) are applied to the electrostrictive element 10. The directions of the electric fields correspond to the polarization directions of the electrostrictive element.

The pitch of the polarization is such that the directions are reversed at the pitch of one half of the wavelength of the travelling wave between adjacent ones, and reversed at the pitch of one quarter of the wavelength between groups. Numerals 20a and 20b denote A.C. drive sources which oscillate with a 90 degree shift from each other. The vibration member 2 and the movable member 3 (not shown in FIG. 5) are of the same construction as those shown in the prior art.

In this structure, the direction of the voltage application, that is, the electric field direction is the same as the expansion/shrinkage direction of the electrostrictive element 10, and the vibration member 2 makes the bending vibration by a longitudinal effect to drive the movable member 3. Accordingly, the drive efficiency is improved. The drive is attained even with a low drive voltage.

Figure 3:
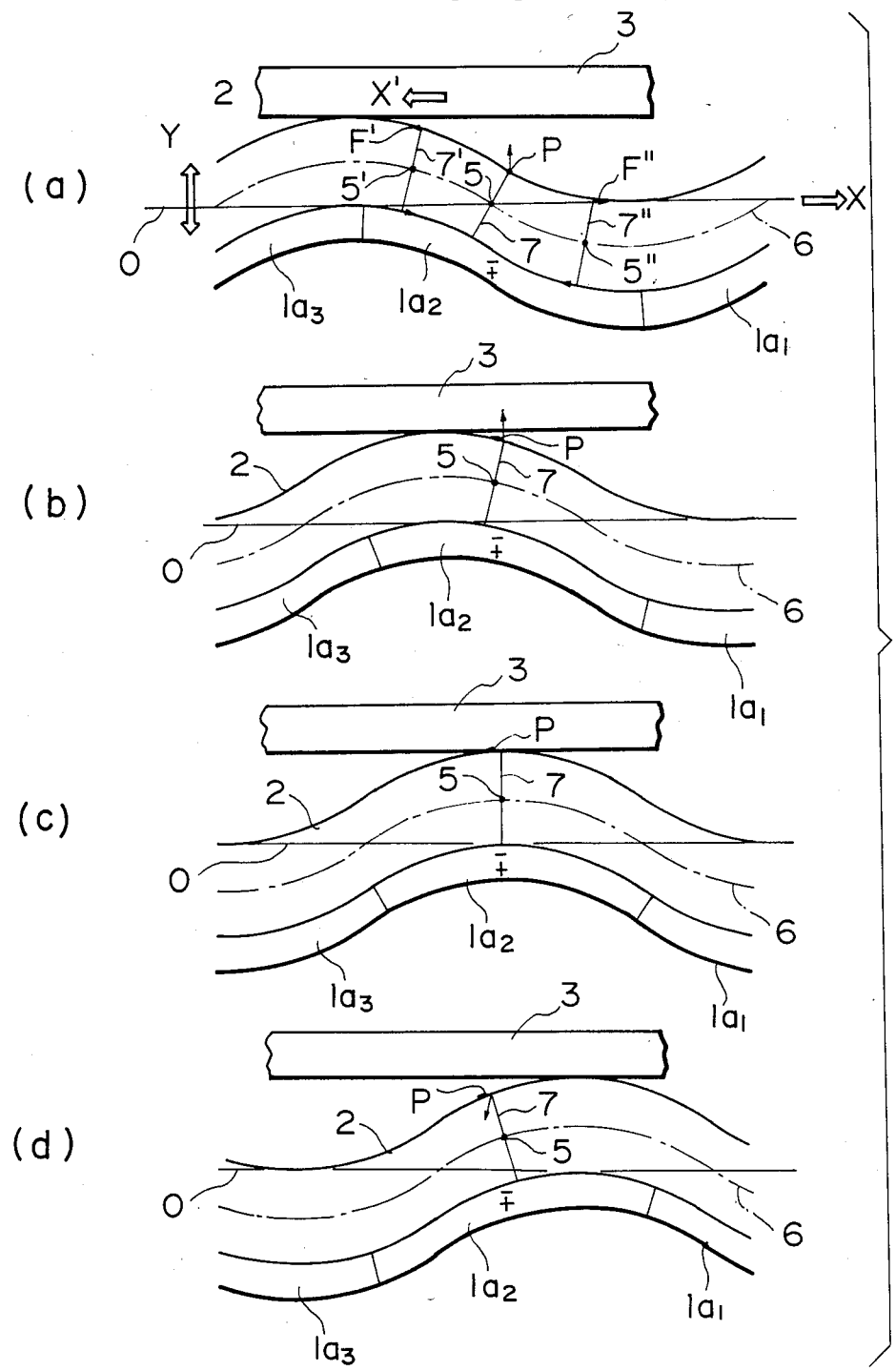
FIG. 3(a)-(d) illustrates a principle of vibration of the vibration wave motor of FIG. 1, FIGS. 4A and 4B illustrate vibration states of the electrostrictive element of FIG. 1, FIGS. 5A and 5B show a first embodiment of a vibration wave motor of the present invention.
Figure 6:
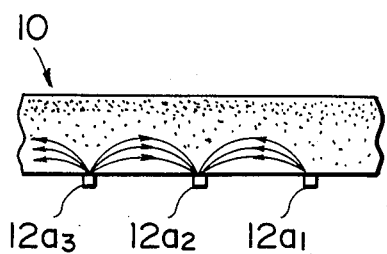
FIG. 6 shows a modification of FIGS. 5A and 5B.

FIG. 6 shows a modification of FIG. 5. Since the electrostrictive element cannot make electrostrictive action at the areas to which the electrodes are mounted, the narrower the electrode, the higher the efficiency of the expansion/shrinkage motion. Since very little current flows through the electrostrictive element, the electrode may be narrow. By reducing the width of the electrodes as shown in FIG. 6, the non-active areas can be reduced. In FIG. 6, electrodes $12a_1$, $12a_2$, $12a_3$, ... correspond to the electrodes $11a_1$, $11a_2$, $11a_3$, ... of FIG. 5.

Figure 7:
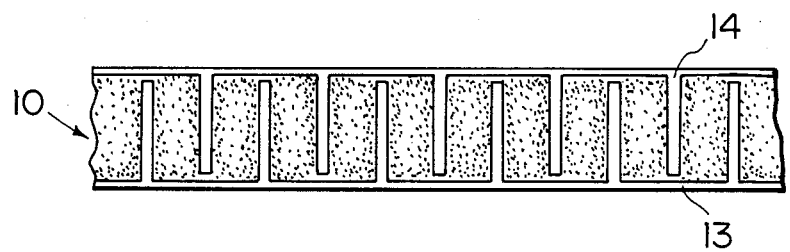
FIG. 7 shows a modification of an electrode shown in FIGS. 5A and 5B.

FIG. 7 shows a modification of the electrode structure of FIG. 5. Numerals 13 and 14 denote electrodes which are comb-shaped and meshed with each other. Thus, alternate electrodes are connected in common and the electrostriction is caused by a potential difference between opposing electrodes. This structure simplifies the wiring.

Figure 8:
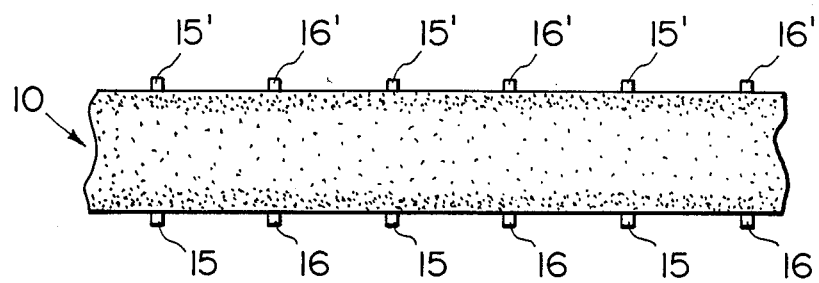
FIG. 8 shows a second embodiment of the vibration wave motor of the present invention.

FIG. 8 shows a second embodiment of the present invention. Electrodes 15' and 16' similar to electrodes 15 and 16 are arranged on the electrostrictive element 10 on the side bonded to the vibration member. The electrodes are polarized at the same pitch and voltages are applied thereto. The lines of electric force become longer and coarser the farther they are away from the electrodes. However, the present structure allows the effective utilization of the electrostrictive element 10.

Figure 9:
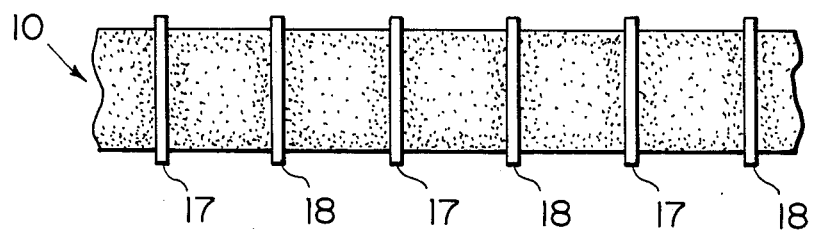
FIG. 9 shows a modification of an electrode of FIG. 8.

In FIG. 9, the invention according to the foregoing embodiment is further modified and electrodes 17 and 18 are arranged on the side surface of the electrostrictive element 10. The electrodes 17 and 18 surround the electrostrictive element 10. In this manner, the electrostrictive element 10 can be utilized more effectively.

Figure 10:
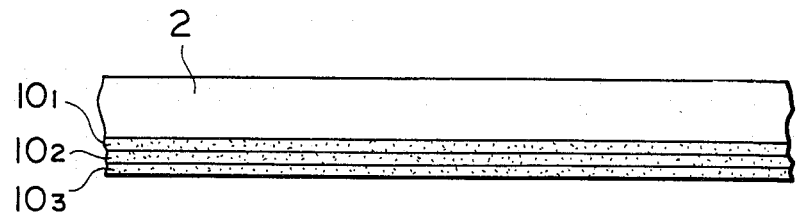
FIG. 10 shows a third embodiment of the vibration wave motor of the present invention.

FIG. 10 shows a third embodiment of the present invention. Thin electrostrictive elements $10_1$, $10_2$ and $10_3$ are stacked. The positions of the electrodes and the polarization pitches of the electrostrictive elements $10_1$, $10_2$ and $10_3$ are matched among the layers. Because the respective electrostrictive element layers are thin, an efficient bending is caused by high electric field density areas.

Figure 11A:
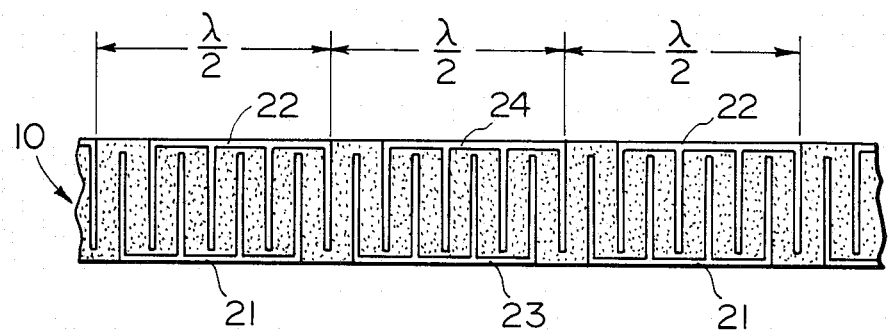
FIGS. 11A and 11B show a fourth embodiment of the vibration wave motor of the present invention.
Figure 11B:
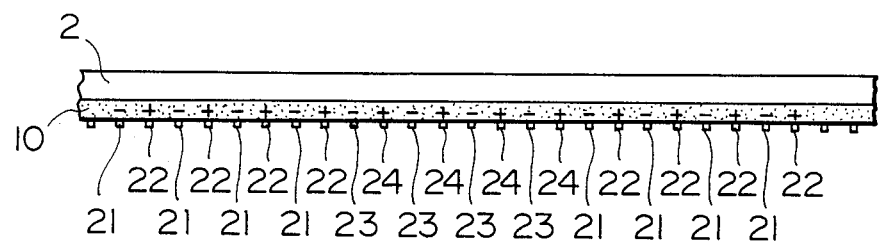

FIGS. 11A and 11B show a fourth embodiment of the present invention. FIG. 11A shows electrodes and FIG. 11B shows a side view. The electrostrictive element 10 is polarized within each ½ λ pitch of the travelling wave, and comb-shaped electrodes 21 and 22 as shown in FIG. 7 are arranged thereto. When a negative voltage is applied to the electrode 21 and a positive voltage is applied to the electrode 22, the portion of the electrostrictive element 10 encircled by the electrode 21 and the electrode 22 is applied with the positive voltage relative to the polarization direction and expands in the lengthwise direction of the electrostrictive element. Since the negative voltage is applied to the electrode 23 and the positive voltage is applied to the electrode 24, a negative voltage relative to the polarization direction is applied to the portion of the electrostrictive element encircled by the electrode 23 and the electrode 24 so that the portion shrinks in the lengthwise direction of the electrostrictive element. Thus, the portion encircled by the electrodes 22 and 23 shrinks and the portion encircled by the electrodes 24 and 21 expands. By applying the A.C. electric fields to the electrodes 21 and 23 and the electrodes 22 and 24, the electrostrictive element 10 makes the expansion/shrinkage motion. In this structure, the electrode pitch may be small and a low voltage drive is attained.

What is claimed is:

1. A vibration wave motor comprising:
   (a) a vibration member having electrostrictive elements on one side surface thereof, and a plurality of electrodes arranged on the surface on which said electrostrictive elements are arranged with a predetermined space therebetween, said electrostrictive elements being polarized in a direction from on electrode to another electrode;
   (b) periodic signal applying means for applying a periodic signal to said electrodes to generate an electric field on said electrostrictive elements between said electrodes in a direction from one electrode to another electrode; and
   (c) a movable member driven by a progressive wave generated on the other side surface of said vibration member.

2. A vibration wave motor comprising:
   (a) a vibration member;
   (b) a plurality of electrostrictive element portions arranged on one side surface of said vibration member, wherein each portion is polarized in a direction along said one side surface of said vibration member;
   (c) a plurality of electrodes arranged on said electrostrictive element portions in said polarization direction;
   (d) periodic signal applying means for applying a periodic signal to said electrodes to generate an electric field in said electrostrictive element portions between said electrodes substantially along the direction of polarization of said electrostrictive element portions; and
   (e) a movable member driven by a progressive wave generated on the other side surface of said vibration member.

3. A vibration wave motor according to claim 2, wherein said plurality of electrostrictive element portions comprise a first group composed of a plurality of electrostrictive element portions and a second group composed of a plurality of electrostrictive element portions, and wherein the phase of said periodic signal to be applied to said electrodes arranged on said first group is different from that to be applied to electrodes arranged on said second group.

4. A vibration wave motor according to claim 1, wherein the width of said electrodes is narrower than that of the electrostrictive element between said electrodes.

5. A vibration wave motor according to claim 1, wherein said electrostrictive element comprises a first group of element portions and a second group of element portions, and the phase of the periodic signal to be applied to electrodes between each polarization portion of the element portion included in said first group is different from that of said second group.

6. A vibration wave motor according to claim 3, wherein said plurality of electrostrictive element portions are formed by applying the polarization process to a single electrostrictive element member.

7. A vibration wave motor according to claim 2, wherein the width of said electrodes is narrower than that of the electrostrictive element between said electrodes.

8. A vibration wave motor according to claim 7, wherein said electrostrictive element comprises a first group including element portions and a second group including element portions, and wherein the phase of the periodic signal to be applied to electrodes between each polarization portion of the element portions included in said first group is different from that of said second group.

9. A vibration wave motor according to claim 5, wherein each polarized electrostrictive element is formed by applying the polarization process to a single electrostrictive element member.

10. A vibration wave motor according to claim 5, further comprising a plurality of said electrostrictive elements, wherein each element has a plurality of electrodes thereon.

11. A vibration wave motor comprising:
    (a) a vibration member;
    (b) a plurality of electrostrictive element portions arranged on one side surface of said vibration member, each being polarized in a direction along said one side surface of said vibration member;
    (c) a plurality of electrodes arranged on said electrostrictive element portions in the direction of the polarization thereof;
    (d) periodic signal applying means for applying a periodic signal to generate an electric field in each of said electrostrictive element portions between the electrodes substantially along the direction of the polarization thereof; and
    (e) a movable member driven by a progressive wave generated on the other side surface of said vibration member.

12. A vibration wave motor according to claim 11, wherein said plurality of electrostrictive element portions comprises a first group composed of a plurality of electrostrictive element portions and a second group composed of a plurality of electrostrictive element portions, and wherein the phase of said periodic signal to be applied to electrodes arranged on each of the electrostrictive element portions included in said first group is different from that to be applied to electrodes arranged on each of the electrostrictive element portions included in said second group.

13. A vibration wave motor according to claim 1, wherein said electrostrictive element is a piezoelectric element.

14. A vibration wave motor according to claim 2, wherein said electrostrictive element is a piezoelectric element.

15. A vibration wave motor according to claim 11, wherein said electrostrictive element is a piezoelectric element.

* * * * *

UNITED STATES PATENT AND TRADEMARK OFFICE
CERTIFICATE OF CORRECTION

PATENT NO. : 4,788,468
DATED : November 29, 1988
INVENTOR(S) : Izukawa, et al.

It is certified that error appears in the above-identified patent and that said Letters Patent is hereby corrected as shown below:

AT [56] IN THE REFERENCES

"Tokusimo" should read --Tokusima et al.--; and

"Notagishira et al." should read

--Notagashira et al.--.

COLUMN 2

Line 12, "accordacne" should read --accordance--; and

Line 28, "quiscent" should read --quiescent--.

COLUMN 3

Line 10, "direction" (second occurence) should read --direction,--; and

Line 62, "diagramatically" should read

--diagrammatically--.

COLUMN 4

Line 2, "$11a_3$..." should read --$11a_3, \ldots$--;

Line 4, "previously" should read --initially--; and

Line 5, "$11a_3$..." should read --$11a_3, \ldots$--.

UNITED STATES PATENT AND TRADEMARK OFFICE
CERTIFICATE OF CORRECTION

PATENT NO. : 4,788,468

DATED : November 29, 1988

INVENTOR(S) : Izukawa, et al.

It is certified that error appears in the above-identified patent and that said Letters Patent is hereby corrected as shown below:

COLUMN 5

Line 37, "on" should read --one--; and

Line 68, "comprise" should read --comprises--.

Signed and Sealed this

First Day of August, 1989

Attest:

DONALD J. QUIGG

Attesting Officer

Commissioner of Patents and Trademarks